United States Patent [19]
Hemphill

[11] Patent Number: 4,523,876
[45] Date of Patent: Jun. 18, 1985

[54] ICE SLOT MAINTENANCE

[75] Inventor: Dean P. Hemphill, Houston, Tex.

[73] Assignee: Shell Oil Company, Houston, Tex.

[21] Appl. No.: 557,493

[22] Filed: Dec. 2, 1983

[51] Int. Cl.³ .............................................. F16L 1/00
[52] U.S. Cl. ..................................... 405/158; 114/42;
405/154; 405/61
[58] Field of Search ................. 405/61, 217, 154, 158;
114/40, 41, 42

[56] References Cited
U.S. PATENT DOCUMENTS

| | | | |
|---|---|---|---|
| 3,667,416 | 6/1972 | Fioravanti et al. | 114/42 |
| 3,766,737 | 10/1973 | Howard | 114/42 X |
| 3,791,328 | 2/1974 | Schirtzinger | 114/42 |
| 3,913,511 | 10/1975 | Weiland | 114/42 |
| 4,436,046 | 3/1984 | Braley | 114/42 |

Primary Examiner—Dennis L. Taylor

[57] ABSTRACT

During winter construction of offshore Arctic pipelines, it is frequently necessary to cut an ice slot in order to lay a pipeline on the sea bottom. Once such slots are cut, they rapidly freeze over, so that it is necessary to remove ice from the slot during the pipelaying time span. The present invention provides a method and apparatus for removing the newly formed ice from the ice slot. An inclined plane, sized to fit within the ice slot width to be maintained, penetrates below the surface of the water within the slot and to a depth at or below the underside of the newly formed ice on the water's surface. By moving the plane along the surface, the ice is raised, broken, and then conveyed upward and then to one side out of the ice slot as spoil.

20 Claims, 2 Drawing Figures

ICE SLOT MAINTENANCE

BACKGROUND OF THE INVENTION

Due to the limited summer work period in Arctic regions, it frequently is desirable to lay offshore pipelines during the wintertime. This usually necessitates cutting ice slots so that the pipeline may be laid through the ice slot and down to the sea bottom. However, once the ice slot is cut, it quickly freezes back over, necessitating the use of some technique for keeping the ice slot free of newly formed ice during the time span in which the pipeline is being laid. Inasmuch as the Arctic regions present severe working conditions both to men and machinery, it is desirable that the ice removal apparatus be relatively simple, free of maintenance and resistant to breaking down. In addition, it is desirable that the apparatus be relatively light in weight since the ice may not support heavy structures, and that the forces that it transmits to the ice surrounding the slot as a result of removing the newly formed ice, be relatively low.

Applicant is not aware of any prior references which, in his judgment as one skilled in the pipeline art, would anticipate or render obvious the novel method and apparatus of the instant invention; however, for the purposes of fully developing the background of the invention and establishing the state of the requisite art, the following is set forth: U.S. Pat. Nos. 4,373,836; 4,205,928; 4,129,011; 4,126,013; 4,094,149; 4,053,406; 3,977,345 and 3,950,955.

SUMMARY OF THE INVENTION

The primary purpose of the present invention is to provide a method and apparatus for removing newly formed ice from an ice slot, which method and apparatus are relatively simple and economical to use, which do not subject the ice surrounding the ice slot to dangerous stresses. An inclined plane is positioned in the ice slot to a depth no less than the interface of the newly formed ice and underlying water, and the inclined plane is moved laterally along the length of the ice slot, thereby breaking up and sliding the newly formed ice up the inclined plane and out the water. Preferably, the newly formed ice is deposited as spoil along either side of the ice slot after being divided into two parts at the top of the inclined plane. The inclined plane may be supported by means located adjacent to the ice slot or it may be supported in whole or in part by buoyant means within the ice slot. The inclined plane may be pulled, pushed, or moved by self-propulsion along the length of the ice slot. Most preferably, the newly formed ice is severed from each side of the ice slot by means just ahead of the inclined plane.

Other purposes, distinctions over the art, advantages and features of the invention will be apparent to one skilled in the art upon review of the following:

DESCRIPTION OF A PREFERRED EMBODIMENT

The present invention pertains to an apparatus and method for removing refrozen ice from a water-flooded slot. An inclined plane is sized to fit within the ice slot width to be maintained, penetrating below the surface of the water within the slot and to a depth at or below the underside of the newly formed ice on the water surface. By moving this plane along the surface, the newly formed ice is raised, broken, and then conveyed upward. The apparatus diverts the ice to one or both sides of the slot where it is deposited in a spoil bank on top of the ice sheet or where it may be directed into a container, vehicle or conveyor for removal from the area. The inclined plane may be equipped with a mechanical conveying system, as well as the diverting means.

Positioning and orientation of the apparatus is controlled by an undercarriage supported from the adjacent ice sheet, by skids, wheels, tracked units, air cushions, etc. Part, or all, of the vertical forces may be supported by a buoyant structure riding within the slot, behind and/or beneath the inclined plane.

The entire apparatus may be moved forward by towing with a vehicle such as a tractor, truck, etc. It is also possible to provide for self-propulsion through the undercarriage provided. Yet another alternative is to utilize a tow line with a form of winch, which is particularly useful in a short ice slot that must be cleaned regularly.

Given low ambient air temperatures, significant freezing activity will occur at the water surface, and the above described plane is attractive for removal of this ice. There is also a re-freezing from the sides of the slot due to the heat sink at the adjacent ice sheet. This side re-freezing is slower in pace, but because of the irregularity of the slot side wall, it is more difficult to remove. A form of side cutter or knife edge preferably is added just beyond the limits of the inclined plane to cut or scrape away the new ice. Alternatively, the cutter may take the form of a closely spaced row of teeth to break or shave the ice, leaving the small particles to float to the surface or be collected by a diverting member onto the inclined plane. The side cutters preferably are arranged to work on the entire depth of the ice sheet.

The present invention is especially advantageous in comparison to the prior art inasmuch as it provides a simple and convenient means to clear and remove ice in one operation with a minimum of labor and equipment, and that may readily be used for repeated maintenance of a slot as often as may be necessary without unduly affecting other work that may be underway. Having thus generally described the apparatus and method of the present invention, a well as its numerous advantages over the art, the following is a detailed description thereof, given in accordance with specific reference to the drawings.

Figure 1:
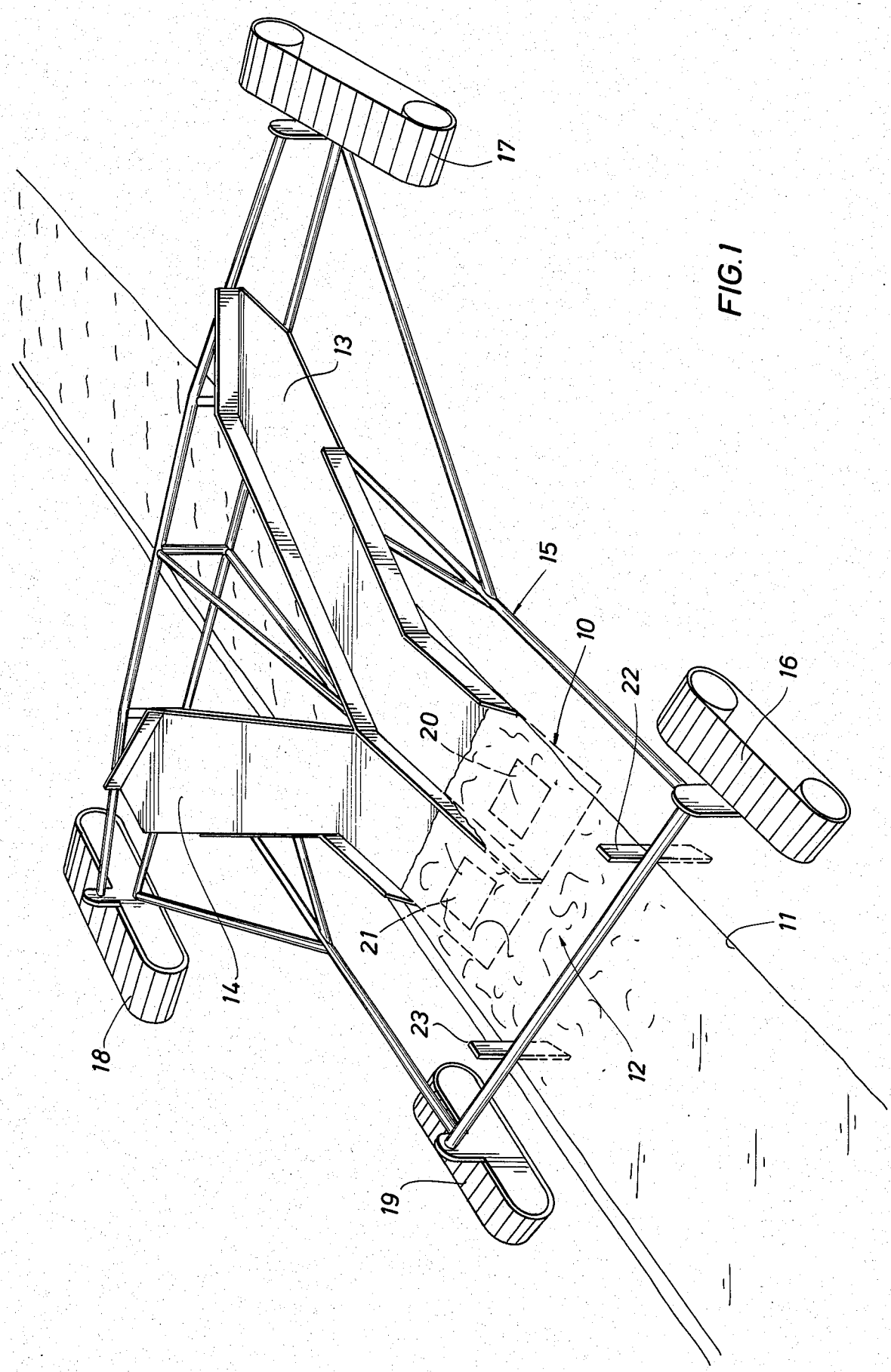
FIG. 1 provides a view of a first embodiment of the invention utilizing self-propelled apparatus.

As shown in FIG. 1, an inclined plane 10 is positioned within ice slot 11 to a depth no less than the inner face of newly formed ice 12 and underlying water. The upper part of inclined plane 10 is divided into a "V" shape such that extending arms 13 and 14 eject ice to either side of ice slot 11. Inclined plane 10 is supported on a structure 15 which comprises a framework of bracing members which in turn is mounted upon tracks or wheel 16-19. Such tracks or wheels may be provided with self-propulsion or the entire unit may be towed by a tractor, etc. In addition, inclined plane 10 may be provided with some buoyancy 20 and 21 on the underside thereof which offsets some of its weight. Just ahead of inclined plane 11 is provided cutting means 22 and 23 which may be a knife blade, a closely spaced row of teeth, etc. Preferably, the ice cutting means 22 and 23 extend all the way to the bottom of the ice slot 11.

Figure 2:
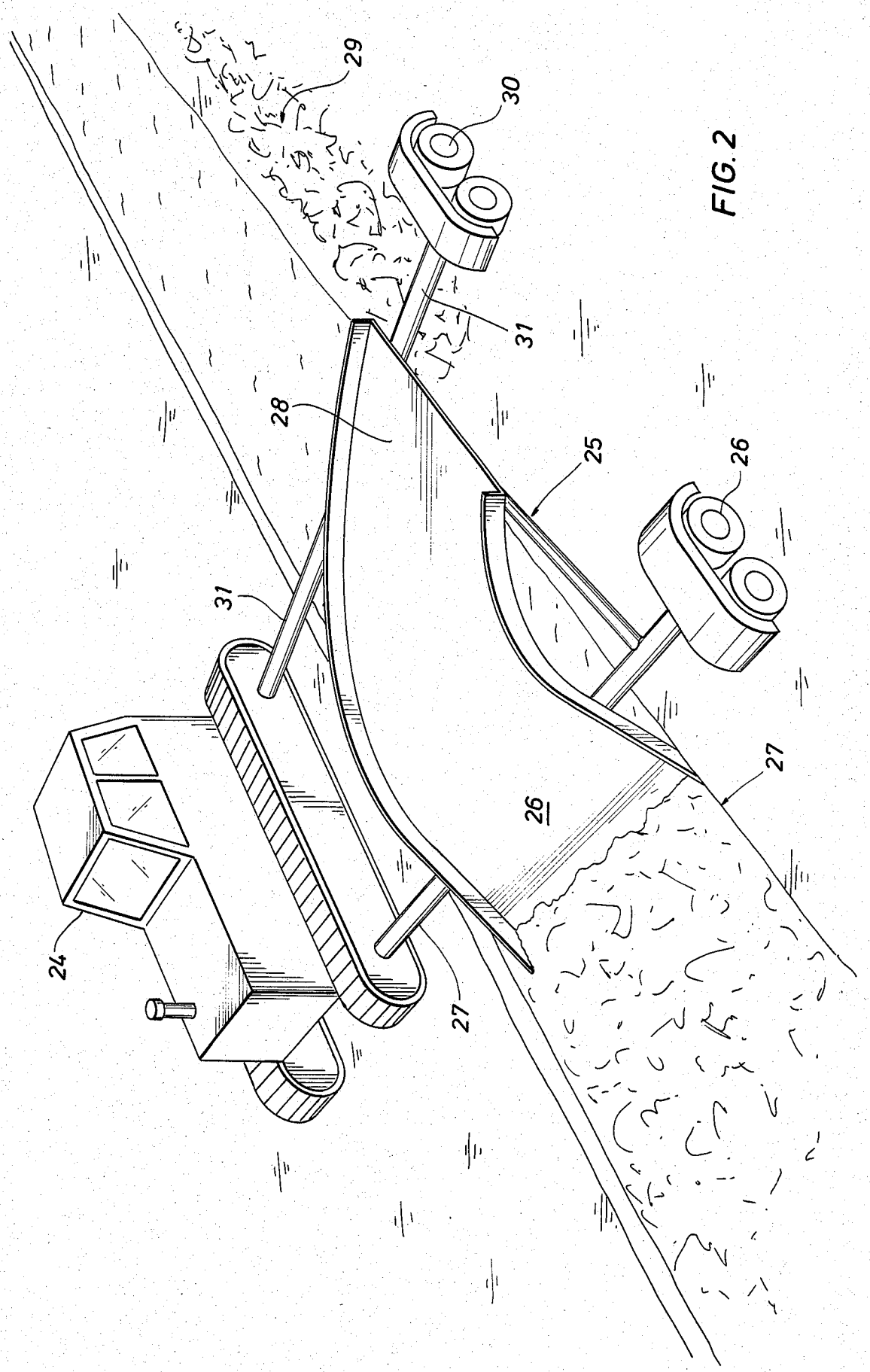
FIG. 2 shows a second embodiment of the invention utilizing apparatus which is being moved with the aid of a tractor.

FIG. 2 shows another embodiment wherein a tractor 24 is utilized both to carry one side of the structure 25 which supports inclined plane 26 and to provide propulsion means. On the opposite side of ice slot 27 from tractor 24 are wheels 26 which are connected to tractor 24 via axle 27 which also supports the forward end of inclined plane 26. The upper part 28 of inclined plane 26 is angled over to the opposite side of ice slot 27 from tractor 24 and functions to deposit ice spoil 29 one side only of ice slot 27. Rear wheels 30 are attached to axle 31 which supports upper part 28 of inclined plane 26 and connects to tractor 24.

When not self-propelled, tracks, wheels, skids or skis may be used to support the structures of FIGS. 1 and 2.

The foregoing description of the invention is merely intended to be explanatory thereof, and various changes in the details of the described method and apparatus may be made within the scope of the appended claims without departing from the spirit of the invention.

What is claimed is:

1. A method for laying a pipeline beneath ice covering water comprising:
cutting an elongated slot in the ice;
removing newly formed ice from the ice slot until the pipeline can be laid through the ice slot by
positioning an inclined plane in the ice slot to a depth no less than the interface of the newly formed ice and underlying water, the inclined plane being at least partly supported by means located adjacent to the ice slot;
moving the inclined plane laterally along the length of the ice slot;
sliding the newly formed ice up the inclined plane and out of the water; and
laying the pipeline through the ice slot.

2. The method of claim 1 wherein the newly formed ice is deposited as spoil alongside the ice slot.

3. The method of claim 2 wherein the newly formed ice is divided into two parts at the top of the inclined plane and one part is deposited on an opposite side of the ice slot from the other part.

4. The method of claim 1 wherein the inclined plane is supported by buoyant means within the ice slot.

5. The method of claim 1 wherein the inclined plane is pulled along the length of the ice slot.

6. The method of claim 1 wherein the inclined plane is pushed along the length of the ice slot.

7. The method of claim 1 wherein the inclined plane is moved along the length of the ice slot by self-propulsion means.

8. The method of claim 7 wherein the self-propulsion means is on the ice adjacent the ice slot.

9. The method of claim 7 wherein the self-propulsion means is in the water within the ice slot.

10. The method of claim 1 wherein newly formed ice is severed from each side of the ice slot ahead of the inclined plane.

11. An apparatus for laying a pipeline beneath ice covering water comprising:
means for removing newly formed ice from the ice slot until the pipeline can be laid through the ice slot, comprising
an inclined plane; means for positioning the inclined plane in the ice slot to a depth no less than the interface of the newly formed ice and underlying water, the inclined plane being at least partly supported by means adjacent to the ice slot;
means for moving the inclined plane laterally along the length of the ice slot, thereby sliding the newly formed ice up the inclined plane and out of the water ; and
means for laying the pipeline through the ice slot.

12. The apparatus of claim 11 including means for depositing the newly formed ice as spoil alongside the ice slot.

13. The apparatus of claim 12 wherein the upper part of the inclined plane is divided into two legs, with each leg extruding over an opposite side of the ice slot.

14. The apparatus of claim 11 wherein the inclined plane is supported by buoyant means within the ice slot.

15. The apparatus of claim 11 including means for pulling the inclined plane along the length of the ice slot.

16. The apparatus of claim 11 including means for pushing the inclined plane along the length of the ice slot.

17. The apparatus of claim 11 including self-propulsion means for moving the inclined plane along the length of the ice slot.

18. The apparatus of claim 17 wherein the self-propulsion means is on the ice adjacent to the ice slot.

19. The apparatus of claim 17 wherein the self-propulsion means is in the water within the ice slot.

20. The apparatus of claim 11 including means for severing the newly formed ice from each side of the ice slot ahead of the inclined plane.

* * * * *